(12) United States Patent  (10) Patent No.: US 6,874,319 B2
Nakatani  (45) Date of Patent: Apr. 5, 2005

(54) HYDROSTATIC TRANSMISSION APPARATUS

(75) Inventor: Yasunobu Nakatani, Sakai (JP)

(73) Assignee: Kubota Corporation, Osaka (JP)

( * ) Notice: Subject to any disclaimer, the term of this patent is extended or adjusted under 35 U.S.C. 154(b) by 66 days.

(21) Appl. No.: 10/392,277

(22) Filed: Mar. 19, 2003

(65) Prior Publication Data
US 2003/0226357 A1 Dec. 11, 2003

(30) Foreign Application Priority Data
Jun. 6, 2002 (JP) ........................ 2002-166063

(51) Int. Cl.$^7$ ............................................. B60K 17/10
(52) U.S. Cl. ........................................................ 60/484
(58) Field of Search ................................... 60/484, 485

(56) References Cited

U.S. PATENT DOCUMENTS

| 4,136,855 A | | 1/1979 | Morrow, Sr. et al. |
| 5,159,992 A | * | 11/1992 | Reinecke et al. ............. 60/484 |
| 5,207,060 A | | 5/1993 | Sheets |
| 6,151,895 A | | 11/2000 | Matsura |

FOREIGN PATENT DOCUMENTS

| GB | 1529247 | 10/1978 |
| GB | 2257496 A | 1/1993 |
| JP | 11-059210 A | 2/1999 |
| JP | 2000 220737 A | 8/2000 |
| JP | 2000220737 A | * 8/2000 | ........... F16H/61/42 |

* cited by examiner

Primary Examiner—Thomas E. Lazo
(74) Attorney, Agent, or Firm—Webb, Ziesenheim, Logsdon Orkin & Hanson, P.C.

(57) ABSTRACT

A hydrostatic continuously variable transmission device includes: a variable displacement type hydraulic pump; a variable displacement type first hydraulic motor operated by a hydraulic oil from the hydraulic pump; a fixed displacement type second hydraulic motor operated by the hydraulic oil from the hydraulic pump; a parallel circuit for continuously connecting hydraulic oil input ports of the first and second hydraulic motors and continuously connecting oil drain ports of the first and second hydraulic motors; and an output confluence mechanism for allowing a rotational output of the first hydraulic motor and a rotational output of the second hydraulic motor to interflow. Switching is selectively made between a first speed state in which a cam plate angle of the variable displacement type first hydraulic motor is equal with a cam plate angle of the fixed displacement type second hydraulic motor and a second speed state in which the cam plate angle of the variable displacement type first hydraulic motor is zero.

3 Claims, 4 Drawing Sheets

HYDROSTATIC TRANSMISSION APPARATUS

BACKGROUND OF THE INVENTION

1. Field of the Invention

The present invention relates to a hydrostatic transmission apparatus which is mounted to a working vehicle such as a tractor or a wheel loader, the apparatus comprising a hydraulic pump and a hydraulic motor.

2. Description of the Related Art

As disclosed in Japanese Patent Application Laid-Open No. 11-59210 (1999), a conventional hydrostatic transmission apparatus generally has a structure consisting of one hydraulic motor and one hydraulic pump, namely, a so-called one pump and one motor type structure.

Normally, the one pump and one motor type hydrostatic transmission apparatus (hereinafter, referred to as an HST) comprises a fixed displacement hydraulic motor and a variable displacement hydraulic pump, and characteristics of an output rotation of the HST and an output torque are determined by the displacements of the hydraulic pump and the hydraulic motor. Namely, the output torque of the hydraulic motor at the time of performing a lowest speed operation cannot exceed a predetermined load pressure (maximum circuit pressure by a relief valve).

For example, the maximum torque of the HST is desired to be strengthened depending on types or the like of an applied working vehicle. As a countermeasure against this case, firstly enlargement of the hydraulic motor and to make displacement of the hydraulic motor variable are considered. In enlargement of the hydraulic motor, namely, means for increasing the displacement of the hydraulic motor (heighten a reducing ratio) should be enlarged in accordance with the displacement of the hydraulic pump. For this reason, this has a difficulty in that reconstruction of an entire hydraulic system is necessary. Moreover, in means in which the hydraulic motor is made to be of the variable displacement type and thus lower speed rotation becomes possible and the torque is heightened, there arises a problem that the reducing ratio as the HST is limited due to a permissible rotating speed of the hydraulic motor and it is difficult to satisfy an initial reducing ratio area. As explained above, any means admit further improvement.

SUMMARY OF THE INVENTION

It is an object of the present invention to provide an HST which is capable of increasing a maximum torque while conversion of a current hydraulic system is suppressed to as little as possible.

In order to achieve the above object, a hydrostatic continuously variable transmission device of the present invention is provided with a variable displacement type hydraulic pump, two hydraulic motors (first hydraulic motor and second hydraulic motor) operated by pressure oil from the hydraulic pump, and a parallel circuit for interconnecting hydraulic oil input ports of the two hydraulic motors to allow them to communicate with each other and interconnecting oil drain ports to allow them to communicate with each other. At this time, at least one of the two hydraulic motors is a variable displacement hydraulic motor, and output rotations of the two hydraulic motors are allowed to interflow by an output confluence mechanism so as to be taken out single output rotation.

In this structure, the two hydraulic motors are connected in parallel so that single output rotation is taken out, thereby making a torque at a certain output rotational speed twice as strong as a conventional torque. In other words, a structure is such that the two hydraulic motors are provided with the hydraulic oil input ports thereof communicating with each other and the oil drain ports thereof communicating with each other, namely, a structure is such that the hydraulic motors are connected tandem in parallel, and further the one of the hydraulic motors is of the variable displacement type. In the case where one hydraulic motor is of a fixed displacement type, an output rotational speed of the other variable displacement type hydraulic motor is adjusted so that the confluent output rotational speed become equal. As a result, an output torque in this state can be approximately double, and when the output rotational speed of the variable displacement type hydraulic motor is adjusted to be zero, the fixed displacement type hydraulic motor can be in the same state as a state that only one fixed displacement type hydraulic motor is provided.

In the case where both the hydraulic motors are of the variable displacement type, when the output rotational speeds of both the hydraulic motors are adjusted so that the confluent rotational speeds become equal, the output torque at the adjusted output rotational speed can be twice as strong as a conventional torque. At the same time, when the output rotational speed of the one variable displacement type hydraulic motor is adjusted to be zero, an output state by the other variable displacement hydraulic motor can be obtained.

In the HST of the present invention, when a one pump and two-motor structure, in which the two hydraulic motors at least one of which is of the variable displacement type are connected in parallel, is adopted, while only local conversion may be made in such a manner that one variable displacement type hydraulic motor is mounted, both requirements for securing of a desired variable area and strengthening of a maximum torque can be satisfied.

According to a preferred aspect of the present invention, one of the two hydraulic motors is of the variable displacement type, and the other is of the fixed displacement type. Further, switching is selectively made between a first speed state in which a cam plate angle of the variable displacement type hydraulic motor is equal with a cam plate angle of the fixed displacement type hydraulic motor and a second speed state in which the cam plate angle of the variable displacement type hydraulic motor is zero.

With this structure, the two hydraulic motors including the fixed displacement type hydraulic motor and the variable displacement hydraulic motor are connected in parallel so that single output rotation is take out, thereby obtaining the maximum torque approximately twice as strong as a conventional torque. Namely, the variable displacement type hydraulic motor is of a two-state switching type selectable between the first speed state in which the cam plate angle is equal with the cam plate angle of the fixed displacement hydraulic motor and the second speed state in which the cam plate angle becomes zero. For this reason, when the variable displacement type hydraulic motor is brought into the first speed state, the output torque becomes approximately double, thereby enabling the maximum torque at which a pressure oil discharge amount of the hydraulic pump per unit time is constricted to be approximately double. When the variable displacement type hydraulic motor is brought into the second speed state, this state is the same as a state that one low displacement type hydraulic motor is mounted, so that a conventional change speed range can be obtained. Namely, while the approximately double maximum torque can be produced by devising a least conversion such that the variable displacement type hydraulic motor having a high/low two-speed switching structure is mounted in a parallel connected state, the required change speed range can be also secured. In such a manner, the rational structure can be provided.

According to another aspect of the invention, output shafts of the two hydraulic motors are aligned with each other. Since the two hydraulic motors are arranged with the output shafts thereof being aligned with each other, in comparison with, for example, a structure in which the output shafts of the two hydraulic motors are gear-interlocked as to function as one output shaft, the structure of the invention is longer in a longitudinal direction but is compact in vertical and transverse directions, so that the change speed device having a reduced dimension in a radial direction of the output shafts can be rezlized. Moreover, in the case where the two hydraulic motors have the same output rotational speed, the output shafts can be directly coupled, so that the structure can be further compact.

Other characteristics and advantages of the present invention become clear from the description of preferred embodiments with reference to the drawings.

DETAILED DESCRIPTION OF THE PREFERRED EMBODIMENTS

Figure 1:
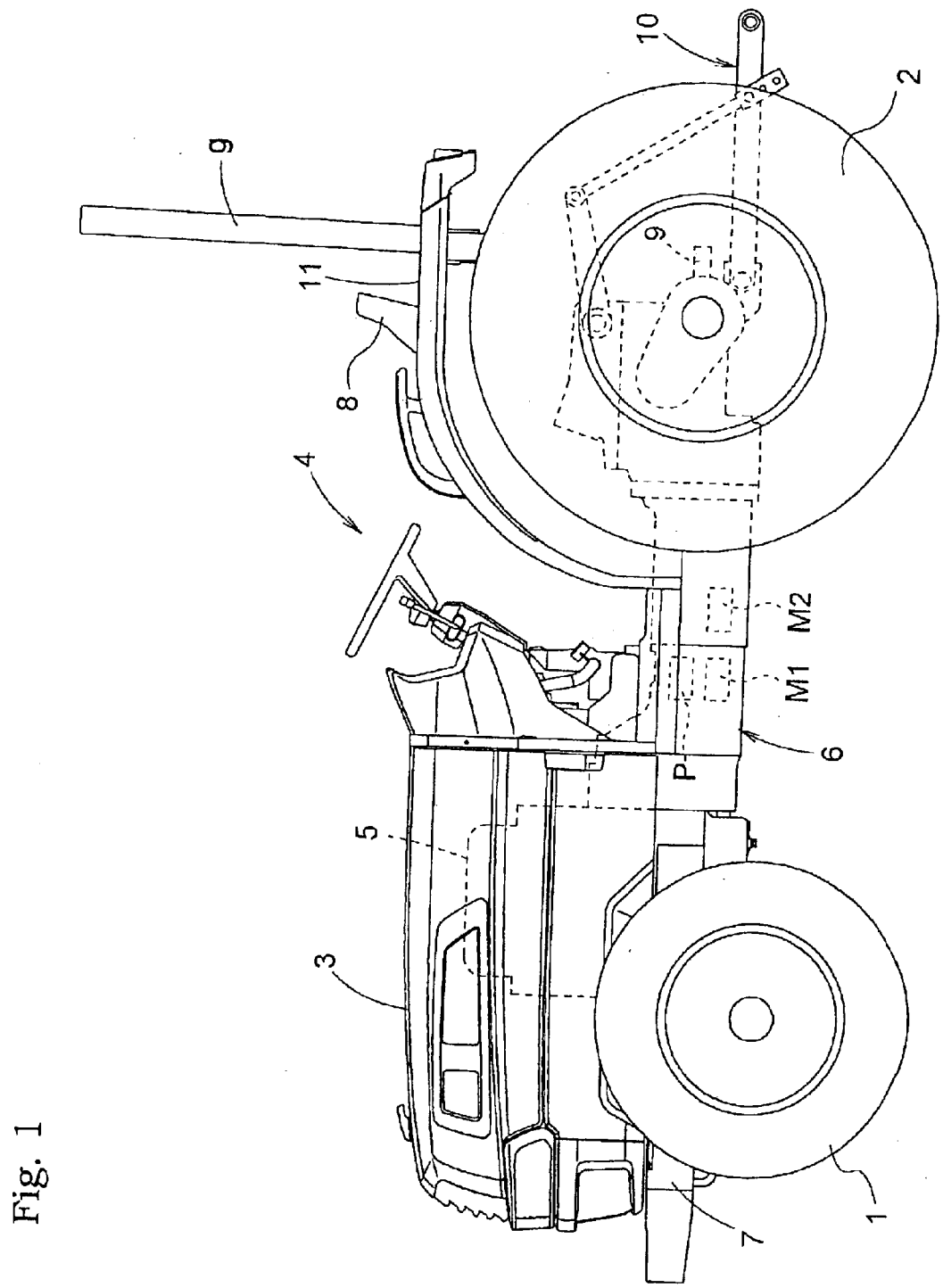
FIG. 1 is a side view of a tractor to which an HST of the present invention is mounted.

FIG. 1 shows a tractor to which an HST of the present invention is mounted. Numeral 1 denotes front wheels, numeral 2 denotes rear wheels, numeral 3 is an engine hood, number 4 denotes a driver's section, numeral 5 denotes an engine, numeral 6 denotes a running transmission, numeral 7 denotes a vehicle body, numeral 8 denotes a driver's seat, numeral 9 is a PTO shaft, numeral 10 denotes a rear working implement, numeral 11 denotes a rear wheel fender, and symbol g denotes a guard member.

Figure 2:
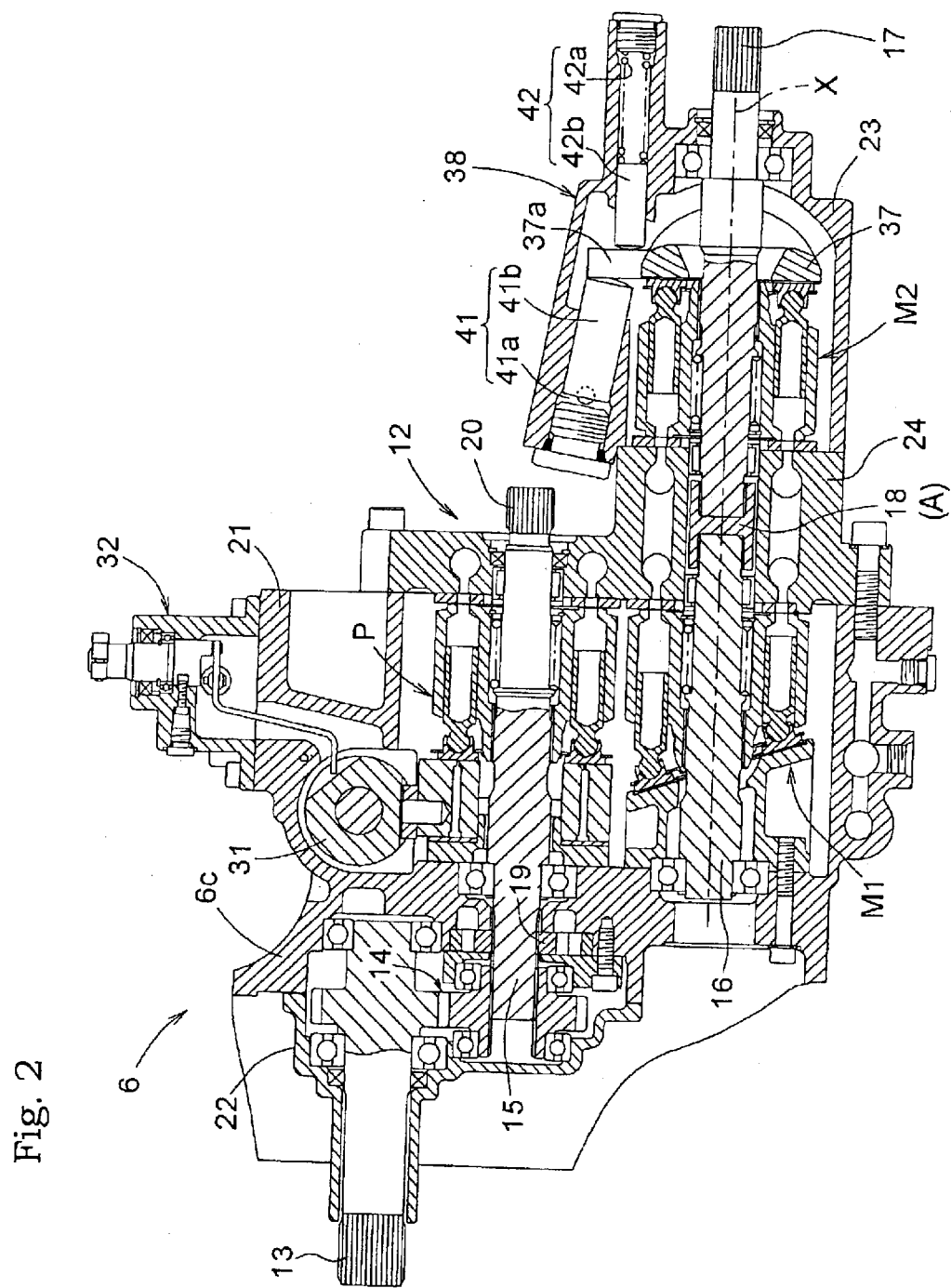
FIG. 2 is a side view showing a structure of the HST in a second speed state.
Figure 3:
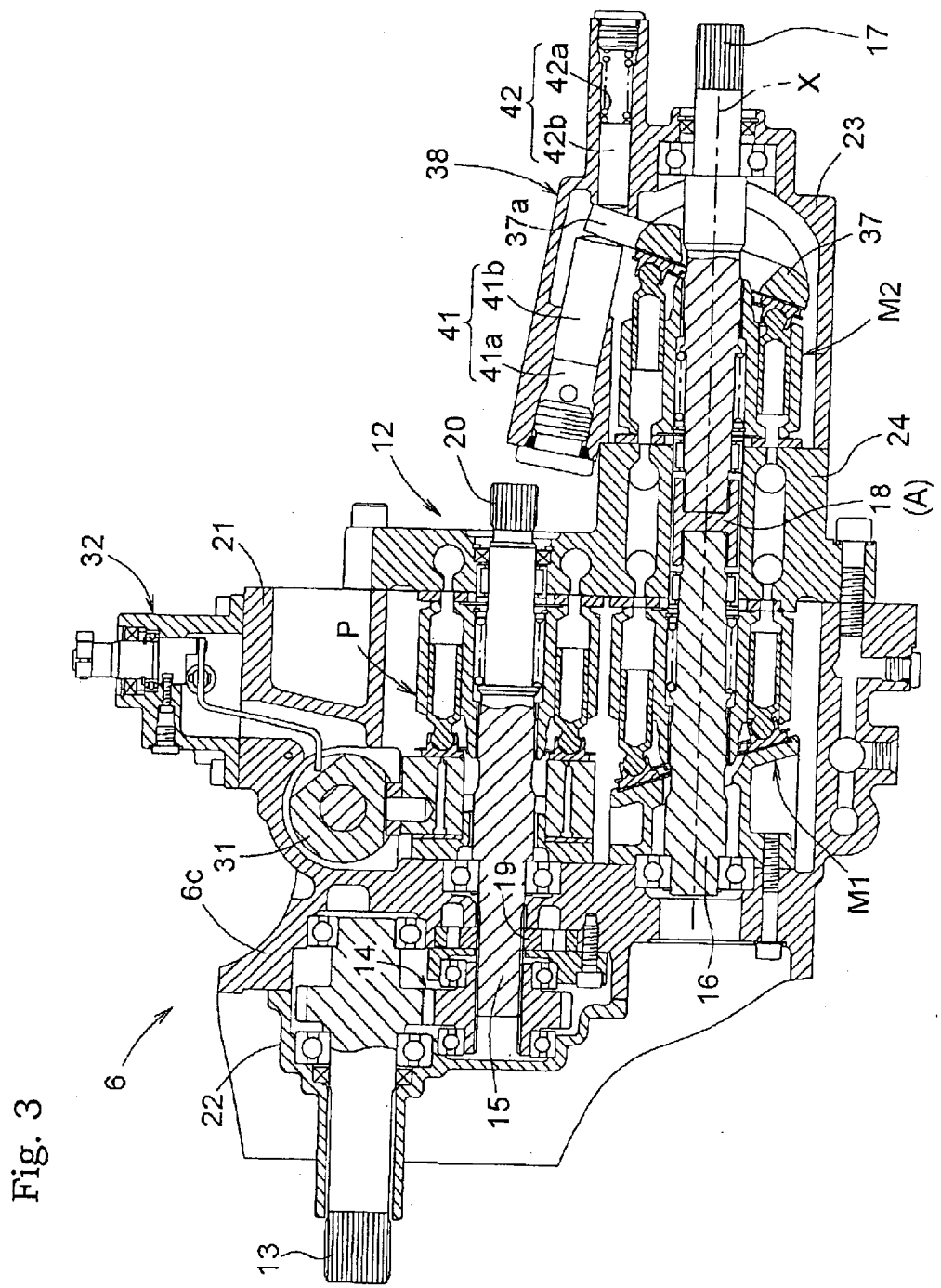
FIG. 3 is a side view showing the structure of the HST in a first speed state.
Figure 4:
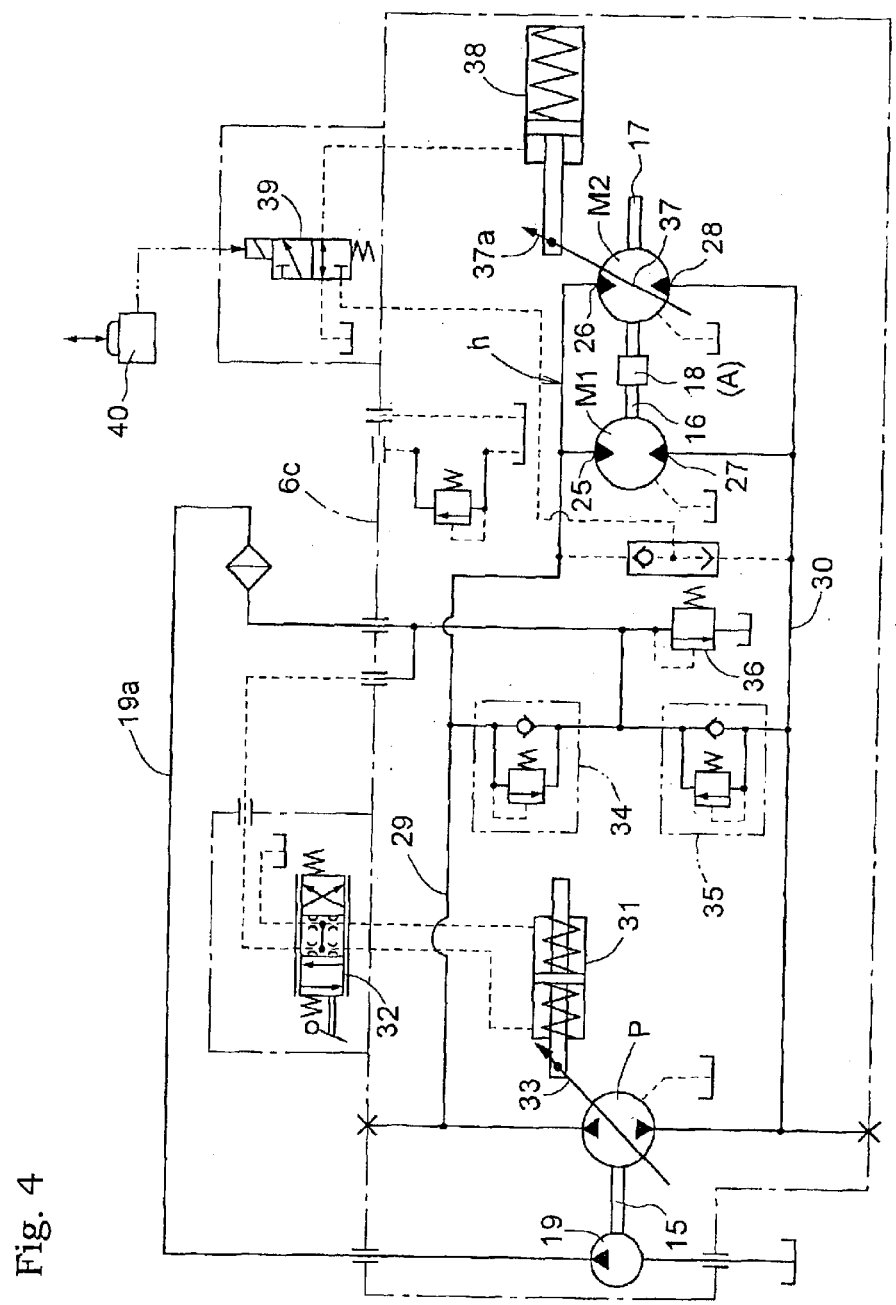
FIG. 4 is a hydraulic circuit diagram of the HST.

FIGS. 2 and 3 show the HST 12 which is a main component of the running transmission 6, and the FIG. 4 shows its hydraulic circuit diagram. The HST 12 transmits an engine power inputted to an input shaft 13 via a flat gear interlocking mechanism 14 to a pump shaft 15 of a variable displacement type hydraulic pump P. Output shafts 16 and 17 of two hydraulic motors M1 and M2 operated by pressure oil of the hydraulic pump P are directly operatively interconnected to each other by a coupling 18 (one example of an output confluence mechanism A). In such a manner, the HST 12 has a one pump and two motor type structure. In FIG. 4, a portion surrounded by a dotted line is a transmission case 6c, and parts illustrated outside it (an oil discharge passage 19a of a charge pump 19, an electromagnetic switching valve 39 to be described later, and the like) are external pipe arrangement and mounting parts externally mounted to the case.

The pump shaft 15 is provided with the charge pump 19 for the HST 12, and has an end protruding outwardly of the transmission case 6c to define a protruding end shaft portion 20 which can be utilized as a live PTO shaft or the like. The transmission case 6c includes a main case 21 for mainly covering the hydraulic pump P and the first hydraulic motor M1, a cover case 22 for supporting the input shaft 13 and the like, a motor case 23 for covering the second hydraulic motor M2 and an oil passage block 24 disposed between the main case 21 and the motor case 23.

As shown in FIG. 4, the plunger type hydraulic pump P is constituted into a variable displacement type, the axial piston type first hydraulic motor M1 is constituted into a fixed displacement type, and the axial piston type second hydraulic motor M2 is constituted into a variable displacement type. Pressure oil input ports 25 and 26 of the two hydraulic motors M1 and M2 are connected to communicate with each other while oil drain ports 27 and 28 are connected to communicate with each other, thereby to form a parallel circuit h to be connected to the hydraulic pump P via a pair of oil feed/drain passages 29 and 30. Numerals 34 and 35 denotes running relief valves for determining maximum load pressures on forward and backward sides, and 36 denotes a main relief valve for determining an upper limit of a circuit pressure. As to the ports 25 through 28 on the input side and the oil drain side, their functions are opposite to each other when an output rotating direction of the HST 12 is a regular rotation and when the output rotating direction is a reverse direction.

When a hydraulic type variable cylinder 31 which interlocks with a cam operating section 33 of the hydraulic pump P is operated by switching a variable valve 32, a cam plate angle of the hydraulic pump P changes and a discharge amount of the hydraulic oil per unit time is changed. Thereafter, energy of the discharged hydraulic oil is converted into a rotating force by the first and second hydraulic motors M1 and M2, so that a rotational power from the input shaft 13 can be freely switched between the forward side and the backward side. The rotational power is continuously changed on the forward side and the backward side and taken out from the output shaft 17 so as to be transmitted to the rear wheels 2 via an auxiliary transmission, not shown. In such a manner, the HST 12 functions.

The second hydraulic motor M2 is of a two-state switching type selectable between a first speed state in which its cam plate angle is equal with a cam plate angle of the first hydraulic motor M1 and a second speed state in which its cam plate angle becomes zero. As shown in FIG. 4, the circuit is provided with a switching cylinder 38 acting on a cam operating section 37a of a cam plate 37 of the second hydraulic motor M2, the two-position switching type electromagnetic switching valve 39 for switching the switching cylinder 38, and a button switch 40 for the electromagnetic switching valve 39. Namely, the button switch 40 is operated so as to switch the electromagnetic switching valve 39 to extend and contract the switching cylinder 38. As a result, the apparatus is freely selectable between the first speed state in which the cam plate 37 tilts (the state shown in FIG. 3) and the second speed state in which the cam plate 37 stands vertically and the angle becomes zero (the state shown in FIG. 2).

The switching cylinder 38 includes an operating section 41 consisting of a cylinder chamber 41a and a piston rod 41b, and a return section 42 consisting of a return spring 42a and a pushing rod 42b. The operating section 41 and return section 42 arranged so as to be opposed to each other in the motor case 23. When the pressure oil is supplied to the cylinder chamber 41a so as to forcibly push the piston rod 41b against an urging force of the return spring 42a, the first speed state shown in FIG. 3 is established. On the other hand, when the oil is drained from the cylinder chamber 41a, the pushing rod 42b pushes back the cam operating section 37a to the 0 degree position by the urging force of the return spring 42a to return to the second speed state shown in FIG. 2 for itself.

The second hydraulic motor M2 is arranged so that an axis X of the output shaft 17 is aligned with the axis X of the output shaft 16 of the first hydraulic motor M1 and they are arranged on one straight line. Therefore, the motor section is elongated in a direction of the axis X (longitudinal direction) but is compact in vertical and transverse directions, and thus its arrangement layout is suitable to a tractor or the like where a space of a transmission is elongated in the longitudinal direction.

In the first speed state, since both the hydraulic motors M1 and M2 have the same cam plate angle, a torque can be approximately twice as strong as a torque from the first hydraulic motor M1. Theoretically the torque becomes double, but since an energy loss such as mechanical friction loss actually exists, the torque which is taken out from the output shaft 17 is "approximately double". Therefore, when the hydraulic pump P is operated at the lowest speed in the first speed state, a maximum torque which is approximately twice as strong as a conventional one can be generated, and this state is suitable to work running in which a load torque of a plow work or the like in a sludge becomes very strong. Moreover, in the second speed state where the tilt angle becomes zero, since the pressure oil passes by the second hydraulic motor, the apparatus can be practically used as the HST in a one motor state mounted with only the first hydraulic motor M1.

[Another Embodiment]

For example, the rotation of the output shaft 17 of the second hydraulic motor M2 may be slowed down to half by a gear reduction mechanism so as to be interlocked with the output shaft 16 of the first hydraulic motor M1. In the first speed state, the tilt angle of the cam plate 37 of the second hydraulic motor M2 may be adjusted so that a rotary speed of the second output shaft 17 becomes twice as high as a rotary speed of the first output shaft 16. In this case the gear reduction mechanism corresponds to the output confluence mechanism A.

The hydrostatic transmission apparatus of the present invention can be applied as a speed change gear of a combine or a working vehicle such as a transport vehicle. Both the first hydraulic motor M1 and second hydraulic motor M2 may be of a variable displacement type.

What is claimed is:

1. A hydrostatic transmission apparatus comprising:
   a variable displacement type hydraulic pump, wherein a pump shaft of said hydraulic pump mounts a charge pump for the hydrostatic transmission apparatus, and a rear end of said pump shaft protrudes outwardly to define a live PTO shaft;
   a variable displacement type first hydraulic motor operable by pressure oil from said hydraulic pump;
   a fixed displacement type second hydraulic motor operable by the pressure oil from said hydraulic pump;
   a parallel circuit for interconnecting pressure oil input ports of said first and second hydraulic motors to allow them to communicate with each other, and interconnecting oil drain ports of said first and second hydraulic motors to allow them to communicate with each other, wherein a passage for interconnecting the hydraulic oil input ports of said first and second hydraulic motors to allow them to communicate with each other and a passage for interconnecting the oil drain ports of said first and second hydraulic motors to allow them to communicate with each other are formed in one common oil passage block, said hydraulic pump and said fixed displacement type second hydraulic motor being arranged on a front surface of the oil passage block, and said variable displacement type first hydraulic motor being arranged on a rear surface of the oil passage block;
   an output confluence mechanism for converging a rotational output of said first hydraulic motor and a rotational output of said second hydraulic motor;
   a switching cylinder for switching over a cam plate angle of said first hydraulic motor; and
   an electromagnetic switching valve for selectively switching said switching cylinder to a first position or a second position.
   wherein said switching cylinder includes a piston rod for hydraulically pushing a cam operating section of said first hydraulic motor, and a return spring for returning said piston rod,
   when said electromagnetic switching valve is switched over to said first position, said piston rod pushes said cam operating section against the force of said return spring so that the hydrostatic transmission apparatus is forcibly switched over to a first speed state in which state the cam plate angle of said first hydraulic motor is equal with a cam plate angle of said fixed displacement type second hydraulic motor, and
   when said electromagnetic switching valve is switched over to said second position, the hydrostatic transmission apparatus is switched over to a second speed state under the force of said return spring in which state said cam plate angle of said first hydraulic motor is zero.

2. The hydrostatic transmission apparatus according to claim 1, wherein output shafts of said first hydraulic motor and said second hydraulic motor are aligned with each other.

3. The hydrostatic transmission apparatus according to claim 2, wherein said output confluence mechanism is a shaft coupling for connecting the output shaft of said first hydraulic motor to the output shaft of said second hydraulic motor.

* * * * *